(12) United States Patent
Passman et al.

(10) Patent No.: US 6,636,256 B1
(45) Date of Patent: Oct. 21, 2003

(54) VIDEO COMMUNICATION SYSTEM

(75) Inventors: William Scott Passman, Lexington, MA (US); Brig Elliott, Arlington, MA (US)

(73) Assignee: Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/378,077

(22) Filed: Aug. 20, 1999

(51) Int. Cl.$^7$ .................................................. H04N 7/18
(52) U.S. Cl. ...................... 348/143; 348/153; 348/159
(58) Field of Search ................................. 348/151, 143, 348/148, 152, 158, 153, 159; 340/125.5, 426, 433, 434, 438; 379/26, 37, 45, 221

(56) References Cited

U.S. PATENT DOCUMENTS

| | | | |
|---|---|---|---|
| 4,814,869 A | 3/1989 | Oliver, Jr. ................... 358/108 |
| 5,491,511 A | 2/1996 | Odle .......................... 348/153 |
| 5,517,236 A | 5/1996 | Sergeant et al. ............ 348/143 |
| 5,557,254 A * | 9/1996 | Johnson et al. ............. 340/426 |
| 5,682,133 A * | 10/1997 | Johnson et al. .......... 340/425.5 |
| 5,809,424 A * | 9/1998 | Eizenhoefer ................ 455/456 |
| 5,850,592 A * | 12/1998 | Ramanathan .................. 455/7 |
| 5,917,405 A * | 6/1999 | Joao ........................... 340/426 |
| 6,038,289 A * | 3/2000 | Sands ........................ 379/9.05 |
| 6,067,571 A * | 5/2000 | Igarashi et al. ............. 709/232 |
| 6,211,907 B1 * | 4/2001 | Scaman et al. ............. 348/148 |
| 6,405,132 B1 * | 6/2002 | Breed et al. ................ 701/301 |

OTHER PUBLICATIONS

Product brochure, ULTRAK, 3 pages included.
Product brochure, Silent Witness, 2 pages included.

* cited by examiner

*Primary Examiner*—Vu Le
(74) *Attorney, Agent, or Firm*—Leonard Charles Suchyta; James K. Weixel

(57) ABSTRACT

A system includes at least one input monitoring unit that monitors an environment and produces a video and an audio signal corresponding to the environment; a Central Monitoring Office that displays image and sound information corresponding to the video and audio signals; and a self-organized mobile wireless communications network. The at least one input monitoring unit is remote from the Central Monitoring Office and transmits the video and audio signals to the Central Monitoring Office over the wireless communication network.

34 Claims, 2 Drawing Sheets

VIDEO COMMUNICATION SYSTEM

BACKGROUND OF THE INVENTION

A. Field of the Invention

The present invention relates generally to video surveillance systems, and more particularly, to the use of a mobile wireless network for transmitting a real-time video signal from a camera at a remote location, to a Central Monitoring Office (CMO). U.S. Pat. No. 5,850,592 entitled "Method for Self-Organizing Mobile Wireless Station Network" discloses the specific details of the mobile wireless network used in this invention and is incorporated herein by reference.

B. Description of the Related Art

One type of conventional video surveillance system consists of cameras that are deployed at remote locations that are desired to be monitored by security personnel. The images from the different cameras are displayed on one or more video monitors at a security console. This type of surveillance system has been effective for improving security in a monitored facility because the system provides images to the console in real-time, and the operator of the system can take immediate remedial action. In order to maintain the system operating at a relatively low cost, the remote locations have to be fixed (i.e., non-mobile remote locations).

The problem of violence between students while on school buses (70,000 school buses in North America) is an escalating one. Numerous reports on television show fights that take place in school buses. Because of this problem, many school districts in North America use video surveillance on school buses. Problems of violence and other illegal activities are common on other forms of public transportation as well.

In another type of conventional video surveillance system used in school buses, video cameras and recorders are placed in a remote and mobile location. School municipalities use this system to monitor violence on buses and prosecute offenders. The operator of the surveillance system (i.e., the school officials) places a video camera recorder in a sturdy tamper-proof box in the interior of the school bus, so that the camera can record images of the interior of the bus. If a violent event takes place on the bus, the bus driver would notify school officials, who remove the videotape from the recorder. The school official uses the videotape to identify the perpetrator of the violence and take disciplinary action. In this type of system, however, real-time information is not provided to the operator of the system. Instead, the images are recorded and then reviewed by the operator. The operator only learns about the violent events long after the event took place, when the damage has already been done. In addition to this disadvantage, without real-time information available there is no knowledge of the geographical location of the vehicle. Thus, the advantage of this second conventional system over the first conventional system is that it facilitates video surveillance from remote, mobile locations. The disadvantage of using this system consists in that the video image provided is not a real-time image, and therefore, the operator of the system cannot take immediate remedial action.

There are techniques that could be used for transmitting video or data signals from a mobile vehicle to a central location, but they all have intrinsic costs or problems. One such technique is direct broadcast. In direct broadcast a video camera is attached to a radio transmitter that directly transmits the image captured by the camera to a CMO. The transmission scheme of this technique has a limited range and runs into problems related to the transmission of a radio signal through obstacles such as tall buildings. Radio transmitters that can go longer distances are physically large and expensive.

An alternative to the use of direct broadcast radio transmitters is to use a third party communication service, such as a cellular telephone company. The cellular network would be used to transmit data from a camera at a remote mobile location to a CMO. Specifically, the Cellular Digital Packet Data (CDPD) standard for data communications (as opposed to simply voice communications) in a cellular system could be used. The main disadvantage of using a third party communication service is that the vehicle would need to establish and maintain an expensive link to a central cell tower (the user is charged on a per-minute basis) for using the CDPD cellular telephone service. This method tends to be expensive and requires the presence of cell towers in the vicinity of the operator's transportation service.

Therefore, there is a need for a video surveillance system that facilitates the transmission of real-time information, including sound, image, and geographical location data, to a CMO from a remote and mobile location, wherein such information transfer is cost effective.

SUMMARY OF THE INVENTION

Accordingly, it is an object of the present invention to meet the foregoing needs by providing systems and methods that perform real-time video monitoring of a remote and mobile environment in a cost-efficient manner.

Specifically, a system for meeting the foregoing needs is disclosed. The system includes at least one input monitoring unit that monitors an environment and produces a video and an audio signal corresponding to the environment; a CMO that displays image and sound information corresponding to the video and audio signals; and a self-organized mobile wireless communications network. The at least one input monitoring unit is remote from the CMO and transmits the video and audio signals to the CMO over the wireless communication network.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

DETAILED DESCRIPTION

Figure 1:
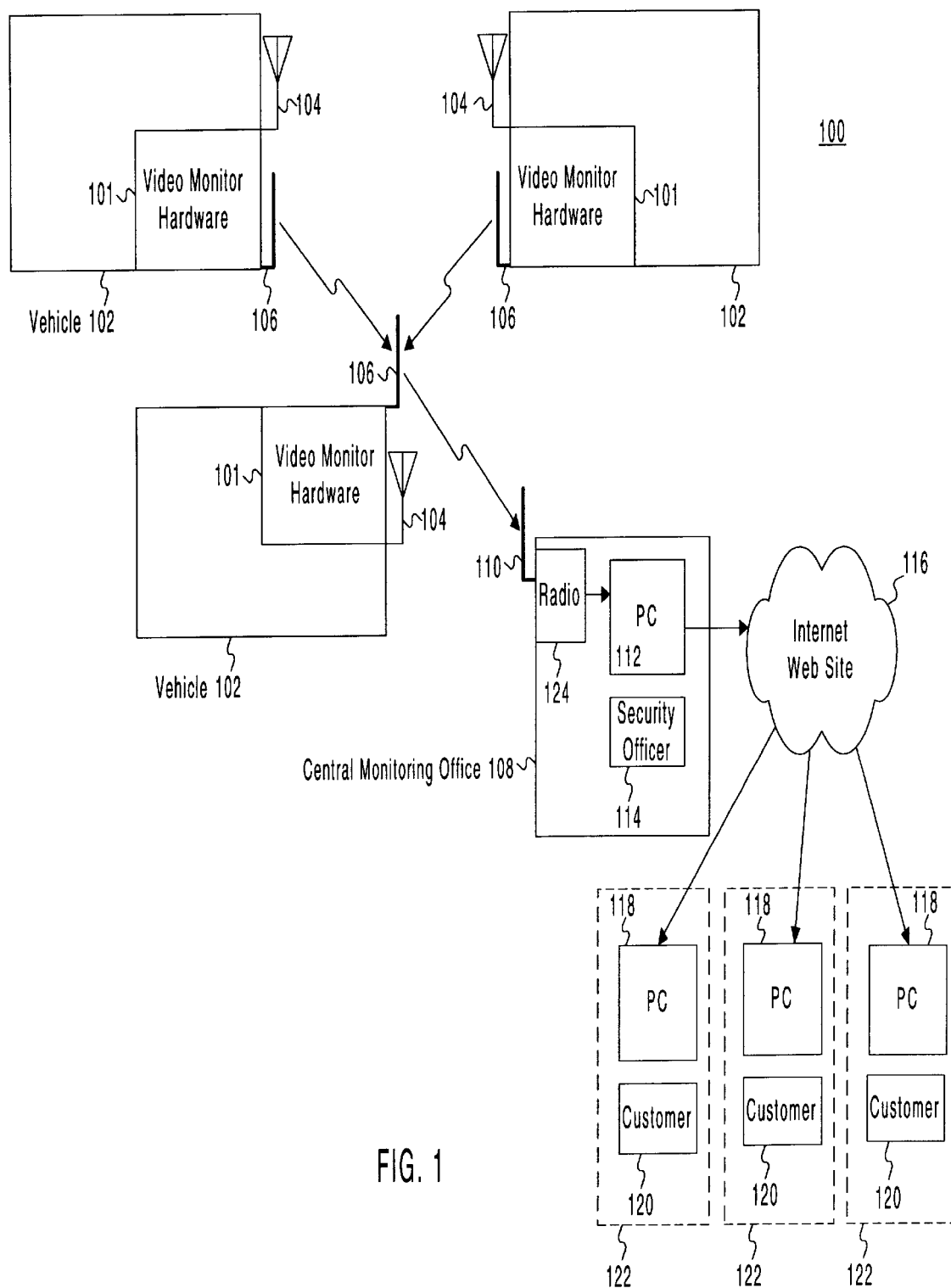
FIG. 1 is a block diagram of the preferred embodiment of the video surveillance system of the present invention.

Reference will now be made to preferred embodiments of this invention, examples of which are shown in the accompanying drawings and will be obvious from the description of the invention. In the drawings, the same reference numbers represent the same or similar elements in the different drawings whenever possible.

Systems and methods consistent with the present invention enable the wireless transmission of real-time audio and video, and geographical location information from distinct remote locations to a system operator's premises (i.e., CMO). For purposes of the following description, the systems and methods consistent with the present invention are only described with respect to video monitoring systems that are remotely deployed in mobile vehicles. The description should also be understood to apply to situations in which the monitoring systems are placed in fixed remote locations.

FIG. 1 shows a system 100 used to transmit real-time information from a video monitoring system in a mobile vehicle in a manner consistent with the present invention. The term "vehicle" as used in this invention refers to a school bus, a taxi, or any other kind of public or private transportation vehicle. The essential components of system 100 include at least one mobile vehicle 102 carrying video monitoring hardware 101, and a CMO 108 having RF communication means 124 and a personal computer 112. An Internet web site 116, and at least one computer 118 at a remote location 122 can optionally be added to system 100, in order to allow a customer to access some of the images obtained by the CMO 108, but without incurring the high operational costs of running such an Office. Antennas are shown for Global Positioning System (GPS) signal transmission and reception 104 and for conventional RF communications (106 and 110).

The GPS antenna 104, connected to the Video Monitoring Hardware 101, receives a signal from a GPS satellite indicating the position of the vehicle. A conventional RF antenna 106 is also connected to the Video Monitoring Hardware 101, and is used to establish wireless communication links with other mobile vehicles 102 and with the CMO 108.

The Video Monitoring Hardware 101 includes a Personal Computer 202 (see FIG. 2) that serves as a node of a wireless network of computers that are interconnected via the aforementioned wireless communications links. The computer 202 runs networking software that implements the method disclosed in U.S. Pat. No. 5,850,592 entitled "Method for Self-Organizing Mobile Wireless Station Network", which is incorporated herein by reference. In essence, the method allows cellular telephone-like radio frequency (RF) communication of digital data, but the data hops from one node to the other, and therefore, this method does not require cell-towers (base stations).

The networking software moves data from a source (e.g., any of the vehicles) to a destination (the CMO) over a wide area by keeping track of all nodes in the near vicinity and routing data to the intended destination via the best nearby node. The best nearby node may be chosen on the basis of the quality of the RF connection, the available data bandwidth, data speed, or any other factor that would help increase the efficiency of the network. Consequently, a group of vehicles can use relatively short-range low-power RF transceivers to communicate over a large area.

The CMO 108 is the recipient of all of the real-time images and location information received from the several monitoring systems 101 deployed in the mobile vehicles 102. The CMO 108 includes an antenna 110 for receiving the real-time information signal from the vehicles 102 over the air, and RF communication means 124 that downconverts, demodulates, and detects the received signal. The Personal Computer 112 displays the several images received from the vehicles 102, and downloads those images into an Internet web site 116. The Internet web site 116 is memory space reserved in the computer server of an Internet service provider, and contains information pertinent to the person or corporation contracting for that memory space. The web site can be accessed by persons through a computer that is connected to the Internet. Some web sites require a special password for accessing the information contained therewith, wherein the persons acquiring access to the web site obtain a password to enter the web site. In the present invention, the person acquiring the right to access the information on the web site is a customer (e.g., a taxi company), which uses the computer 118 located in the customer premises 122 to access the Internet web site 116.

Figure 2:
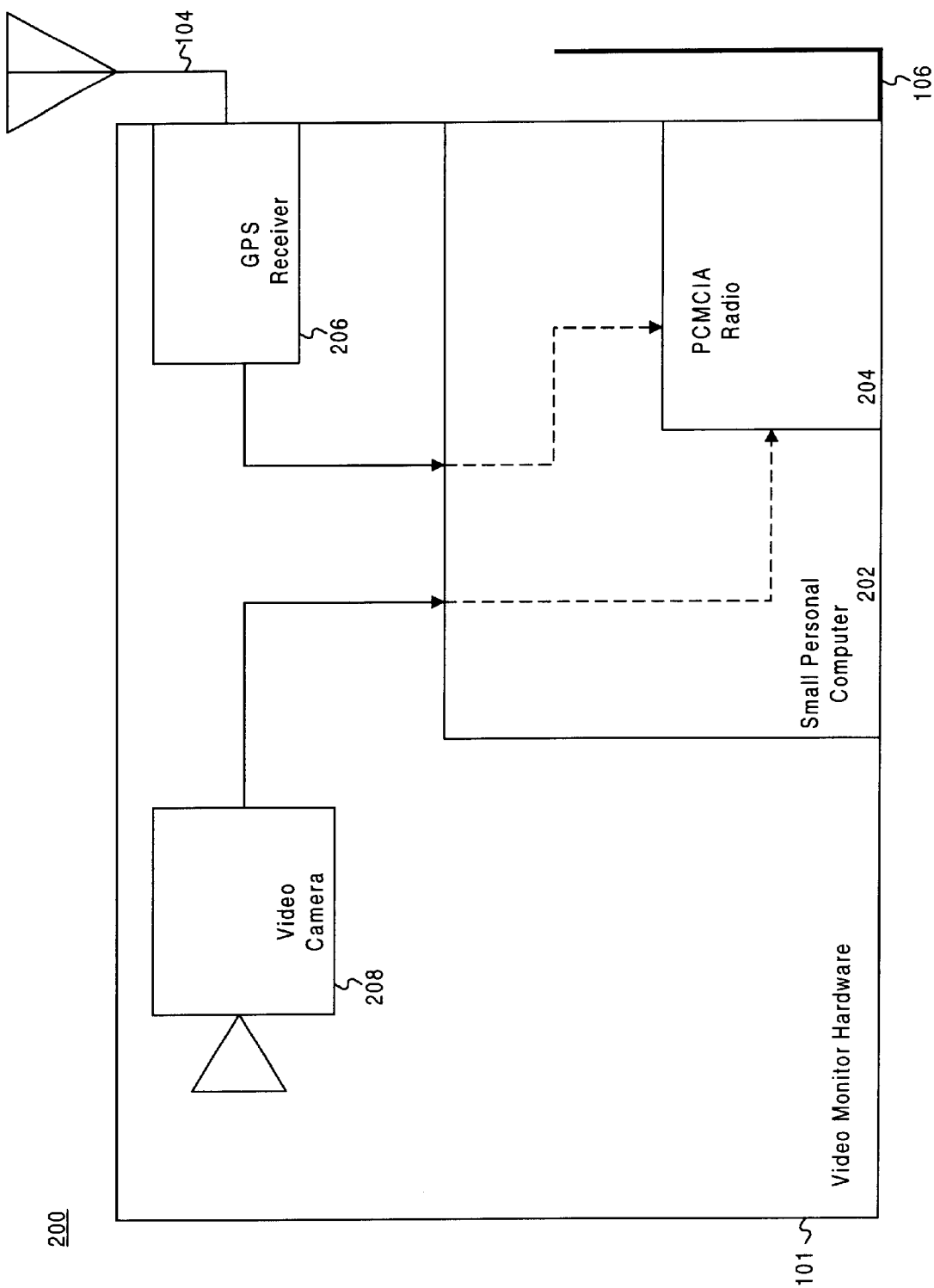
FIG. 2 is a block diagram of the Video Monitoring Hardware in FIG. 1.

FIG. 2 depicts a block diagram of the Video Monitoring Hardware 101 of FIG. 1. It includes a video camera 208, a GPS transceiver 206, and a small personal computer 202 with a PCMCIA RF transceiver 204. The video camera 208 captures real-time images and sound from inside the vehicle 102. The camera is physically connected to the computer 202 and passes the sound and image information to the computer via that connection. The GPS transceiver 206 decodes the GPS signal received by the antenna 104 from a GPS satellite (not shown) and sends the decoded signal to the computer 202.

The computers 202 in the wireless network are programmed to collect video images and audio from the cameras, and location coordinates from the GPS transceiver 206. The computer 202 forwards that information along a dynamically determined path to the CMO 108 which collects video images and GPS information from every node. The computer 202 includes a PCMCIA RF transceiver 204 that forwards the acquired real-time information to other PCMCIA RF transceivers 204 in the system.

As mentioned above, the information and pictures from all of the mobile vehicles 102 could optionally be presented on an Internet web site 116. Customers can monitor the location and video information of the mobile vehicles of their interest from their computer 118 at a remote location 122.

A typical operation of the video surveillance system would start by having the camera 208 in the vehicle 102 capture the sound and image of two students involved in a fight. The computer 202 receives these video and audio signals, as well as information provided by the GPS transceiver 206 about the geographical location of the vehicle 102.

The computer 202 runs a first program to digitize the image received, runs a second program to monitor the GPS signal received, and runs a third program, namely a multihop networking program, to implement the method disclosed in the aforementioned patent. The computer 202 sends the real-time information to the PCMCIA RF transceivers 204. The transceiver 204 transmits the information to either a PCMCIA transceiver 204 in another vehicle 102, or if this vehicle in particular is the closest vehicle to the CMO 108, to the RF communication means 124 of the CMO 108.

U.S. Pat. 5,850,592 shows, in general, that if nodes in the system, located at point A and point B (e.g., a mobile vehicle and the CMO), are within radio range of each other, they will transmit directly and not impact any other nodes. If nodes at point A and point B are out of direct radio range, the network software finds a route for the data to go from point A to point B via other nodes of the system. This route is determined by collecting information from all the other nodes in the system, particularly, information about the nodes connectivity.

Nodes at both point A and point B can be stationary or mobile. The networking software is always monitoring its neighbors and updating its links, so as nodes move geographically, the links may change, but the message will still get to point B.

The foregoing discussion shows only the general operational principles of the self-organized mobile wireless communications network used in the present invention. The manner in which the transceivers 204 acquire information about the vicinity of other transceivers 204, and specific details about the networking aspects of the invention are explained in the aforementioned patent.

When the real-time information arrives at the CMO computer 112, the sound, image and geographical location information are displayed on the screen of the computer 112. A security officer in the CMO 108 oversees the operation of the video surveillance system. When a problem arises in one of the school buses, the security officer calls the police to report the incidents, and provides the police with information about the school bus location.

As an alternative to having the security officer monitor all of the incoming images from different school buses, the images can be automatically downloaded to an Internet web site. When this approach is used, the company that is responsible for downloading the real-time information to the web site and for running the video surveillance system is still referred to as an operator. The persons that buy access into the operator's web site are the customers.

The different images in the Internet web site 116 correspond to particular sub-groups of school buses and can be accessed by customers. The images are accessed by using a personal computer 118 with an Internet connection and with an Internet web browser (e.g., Netscape Navigator).

One advantage of the operator-customer scheme over the single operator scheme is that the location of the customer (customer premises 122) does not depend on the location of the buses because the images are transmitted to the customer computer 118 through the Internet. By contrast, the location of the operator (CMO 108) depends, on the location of the buses that carry the video surveillance system. That is, because the PCMCIA transceivers 204 have a limited coverage range, for example, 2 miles, the operator location 108 is limited to the location of the school district. In the situation in which the video monitoring system is used for other purposes (not in school buses), the operator 108 must be located within a certain range of at least one of the PCMCIA transceivers 204.

Another advantage of the operator-customer scheme is that it allows customers at remote locations 122 to enjoy the benefits of the present invention, without incurring in costs of running a CMO. This is particularly important when a customer has an interest in monitoring only a subgroup of the vehicles that are part of the system 100.

The system of the present invention works well in an environment where there are a number of nodes in a geographical area, where the nodes can use each other as data relays to the destination. A problem that might arise is that of "dead" spots. As mentioned before, the PCMCIA transceivers 204 have limited coverage. For the system to function, all of the RF transceivers, including the PCMCIA transceivers 204 as well as the RF communication means 124 of the operator, must be within a certain distance of each other. If one of the transceiver units 204 is isolated from the rest of the RF transceiver network (e.g., more than 2 miles apart from other transceivers 204 currently operating in the network), that transceiver unit will be unable to successfully transmit real-time information to the CMO 108.

The solution to the dead spots problem is to have transceiver relay units placed in boxes attached, for example, to telephone poles located in the dead spots. The decision of placing relay units in telephone poles is left to the system designer for that particular school district, since factors such as the bus routes and the city layout differ for each system.

In conclusion, the present invention provides a new way of communicating images or messages between two points. Data is sent between two points, A and B, either directly from point A and point B, or can be transmitted from point A to point B, indirectly via a number of intermediate peer transceivers running the same networking software.

The present invention discloses a video surveillance system that uses ad-hoc networking to move data from vehicle to vehicle until the data reaches a CMO. The alternative to ad-hoc networking is to use commercial wireless telephone technology, like CDPD, to transmit video images from a mobile vehicle to a cell site, and from the cell site to the CMO. The use of commercial wireless telephone technology, however, is an expensive alternative.

The wireless network technology allows an operator (e.g., a school district) to inexpensively monitor vehicles in real time. The main advantage of real-time monitoring over video recording is that real-time monitoring allows the operator to act immediately, as opposed to after the fact. If a security officer is watching a real-time image of the interior of a vehicle, and sees a fight break out, the officer can call the police and give them the location of the bus. The police would then be able to stop the violence before the situation gets out of control.

Other benefits which an operator may take advantage of consist in providing a service in which customers are informed of the arrival time of a public transportation vehicle to their destination, since the real-time information that is available includes the geographical location of the vehicles 102. Riders of school buses, transit buses, and taxis always want to know when the vehicle will arrive at their destination. A customer (e.g., a taxi company) with access to an Internet web site can be friendlier to its patrons by having this information readily available. This would prove to be especially useful in inclement weather, when a person wants to spend as little time as possible standing in the rain.

In the case where the video surveillance system of this invention is used as part of a building security system, the disclosed ad-hoc networking technique offers additional benefits over conventional video surveillance systems. One type of conventional video surveillance system requires the installation of cables or fibers to relay the signal from the camera locations to a CMO. The present invention makes use of RF transceiver technology, which saves the cost of cable installation.

If direct broadcast technology is used to transmit the signal captured by the camera instead of cable technology, large radios would still be needed, which cost more than the small RF transceivers used in the present invention. Furthermore, the self-configuring nature of ad-hoc networking techniques save the cost and complexity of setting up traditional radio links.

The foregoing description of preferred embodiments of the present invention provides an exemplary illustration and description, but is not intended to be exhaustive or to limit the invention to the precise form disclosed. Modifications and variations are possible in light of the above teachings or may be acquired from practice of the invention.

What is claimed is:

1. A monitoring system comprising:
   at least one input monitoring unit that monitors an environment and produces a video and audio signal corresponding to the environment;
   a central monitoring office that displays video image information corresponding to the video and audio signals; and a self-organized mobile wireless communication network coupled to the at least one input monitoring unit, wherein the at least one input monitoring unit is remote from the central monitoring office and transmits the video and audio signals, via the wireless communication network, directly to the central monitoring office, or indirectly to the central monitoring office via a route that traverses at least one other input monitoring unit coupled to the wireless communication network, said route being dynamically determined based on at least one network efficiency parameter.

2. The system of claim 1, wherein the at least one input monitoring unit includes a source node of the wireless communications network, and the central monitoring office includes a destination node of the wireless communication network.

3. The system of claim 1, wherein the video image information is in real-time, and the at least one input monitoring node includes:

a video device that obtains an image of an environment and produces said video signal corresponding to the image;

a GPS transceiver for receiving a position signal from a GPS satellite, the position signal corresponding to a real-time geographical location of the environment;

a computer connected to the GPS transceiver, the video device, and the audio device; and an RF transceiver connected to the computer; wherein the computer receives the image signals from the video device, receives the position signal from the GPS transceiver, and transmits the video and position signals to the central monitoring office over the self-organized mobile wireless communications network by using the RF transceiver.

4. The monitoring system of claim 3, wherein the computer transmits the video and position signals to the central monitoring office using a short-range low-power RF transceiver.

5. The system of claim 1, wherein the video image information is in real-time, and the central monitoring office includes:

an RF transceiver; and a computer connected to the RF transceiver; wherein the RF transceiver receives the video signals sent by the at least one input monitoring unit over the self-organized mobile wireless communication network and the computer displays the image information corresponding to the video signals.

6. The system of claim 1, wherein the central monitoring office receives the video signals, an operator in the central monitoring office downloads image information corresponding to the video signals into an Internet web site, and at least one person at a remote location accesses the image information from the Internet web site.

7. The system of claim 6, wherein the at least one input monitoring unit monitors the environment inside a mobile vehicle.

8. The system of claim 7, wherein the at least one input monitoring unit includes a GPS transceiver and the video signal includes information about the location of the mobile vehicle provided by the GPS transceiver.

9. The system of claim 8, wherein the audio and video signals carry real-time sound and image information.

10. The system of claim 7, wherein the audio and video signals carry real-time sound and image information.

11. The system of claim 6, wherein the audio and video signals carry real-time sound and image information.

12. The system of claim 1, wherein the at least one input monitoring unit monitors the environment inside a mobile vehicle.

13. The system of claim 12, wherein the at least one input monitoring unit includes a GPS transceiver and the video signal includes information about the location of the mobile vehicle provided by the GPS transceiver.

14. The monitoring system of claim 1, wherein the dynamically determined route is based on the location of the other input monitoring units.

15. The monitoring system of claim 1, wherein the dynamically determined route is based on improving the network efficiency.

16. The system of claim 1, wherein the at least one input monitoring unit includes a source node of the wireless communications network, the at least one other monitoring unit includes an intermediate node, and the central monitoring office includes a destination node of the wireless communication network.

17. The system of claim 1, wherein the at least one network efficiency parameter includes at least one of RF connection quality, bandwidth, and data speed.

18. A system comprising:

means for monitoring an environment;

means for producing a video and an audio signal corresponding to the environment; and means for transmitting the video and audio signals directly to a central monitoring office, or when said signals cannot be directly transmitted to the central monitoring office, indirectly to said monitoring office over a route that traverses at least one intermediate transmitting means associated with a self-organizing wireless communication network.

19. The system of claim 18 further comprising means for obtaining video and audio information from the Internet, the video signal including information associated with the geographical location of the environment.

20. The system of claim 19, wherein the audio and video signals carry real-time sound and image information.

21. The system of claim 18, wherein the audio and video signals carry real-time sound and image information.

22. The system of claim 18 further comprising means for displaying in the central monitoring office video and audio information corresponding to the video and audio signals.

23. The system of claim 22, wherein the audio and video signals carry real-time sound and image information, respectively.

24. In a self-organized mobile wireless communications network, at least one source node and at least one destination node, the at least one source node located in at least one input monitoring unit, the at least one destination node located in a central monitoring office, and the at least one input monitoring unit being remote from the central monitoring office, the at least one input monitoring unit comprising:

a video device that obtains an image of an environment and produces a real-time video signal corresponding to the image;

an audio device that obtains sound from the environment and produces a real-time audio signal corresponding to the sound;

a GPS transceiver for receiving a position signal from a GPS satellite, the position signal corresponding to a real-time geographical location of the environment;

a computer connected to the GPS transceiver, the video device, and the audio device; and an RF transceiver connected to the computer, wherein the computer receives the real-time video and audio signals from the video device and the audio device, receives the position signal from the GPS transceiver, and transmits, using the RF transceiver, the video, audio, and position signals to the central monitoring office over the self-organized mobile wireless communications network, and wherein the transmitted video, audio, and positional signals are routed from the at least one source node directly to the at least one destination node or, when said signals cannot be directly transmitted to the destination node, indirectly to said destination node over a route that traverses at least one intermediate node located in at least one other input monitoring unit.

25. In a self-organized mobile wireless communications network, at least one source node and at least one destination node, the at least one source node located in at least one input monitoring unit, the at least one destination node located in a central monitoring office, and the at least one input monitoring unit being remote from the central monitoring office, the central monitoring office comprising:

an RF transceiver; and a computer connected to the RF transceiver; wherein the RF transceiver receives real-time video and audio signals sent by the at least one input monitoring unit over the self-organized mobile wireless communications network and the computer displays real-time image and sound information corresponding to the real-time video and audio signals, respectively, wherein the real-time video and audio signals are routed directly to the RF transceiver from the at least one input monitoring unit or, when said signals cannot be directly transmitted to the central monitoring office, indirectly to the RF transceiver over a route that traverses at least one intermediate node in the self-organized mobile wireless communications network.

26. The network of claim 25, wherein the computer downloads the real-time audio and video information into an Internet web site, and at least one person at a remote location accesses the audio and video information from the Internet web site via an Internet connection.

27. The system of claim 1, wherein the audio and video signals carry real-time sound and image information.

28. In a self-organized mobile wireless communications network having at least one source node and a destination node, the at least one source node located in at least one input monitoring unit, the destination node located in a central monitoring office, and the at least one input monitoring unit being remote from the central monitoring office, a method for monitoring an environment using the at least one input monitoring unit, and for transmitting real-time video and audio signals corresponding to that environment from the at least one input monitoring unit to the central monitoring office, the method comprising:

obtaining an image of the environment and producing a video signal corresponding to the image;

obtaining sound from the environment and producing an audio signal corresponding to the image;

receiving a position signal from a GPS satellite;

transmitting the video, audio, and position signals from the at least one input monitoring unit to the central monitoring office over the self-organized mobile wireless communication network, wherein the at least one source node transmits the audio, video, and positional signals directly to the destination node or, when network efficiency would be improved, indirectly to said destination node via a route that traverses at least one intermediate node located in at least one other input monitoring unit; and displaying information corresponding to the video, audio and position signals in the central monitoring office.

29. The method of claim 28, further comprising: downloading the information corresponding to the audio, video and position signals from the central monitoring office into an Internet web site.

30. The method of claim 29, wherein the at least one input monitoring unit monitors the environment inside a mobile vehicle.

31. The method of claim 28, wherein the at least one input monitoring unit monitors the environment inside a mobile vehicle.

32. A monitoring system comprising:

at least one input monitoring unit, associated with a self-organizing wireless communication network, that monitors an environment and produces a video and audio signal corresponding to the environment; and a central monitoring office, remotely located with respect to the at least one input monitoring unit, that displays video image information corresponding to the video and audio signals, wherein the at least one input monitoring unit transmits the video and audio signal directly to the central monitoring office or, when said signals cannot be directly transmitted to the central monitoring office, indirectly to said monitoring office over a route that traverses at least one other monitoring unit coupled to the self-organizing wireless communication network.

33. The monitoring system of claim 32, wherein the at least one other input monitoring unit is chosen based on the location of all the input monitoring units present in the network.

34. The monitoring system of claim 32, wherein the at least one other input monitoring unit is chosen on the basis of connection quality, available data bandwidth, and data speed.

* * * * *